Patented Mar. 6, 1951

2,543,955

UNITED STATES PATENT OFFICE 2,543,955

STABILIZATION OF DDT SOLUTIONS AT LOW TEMPERATURES BY MEANS OF NITROCYCLOPARAFFINS

Loyd Q. Boyd, Hammond, Ind., assignor to Standard Oil Company, Chicago, Ill., a corporation of Indiana No Drawing. Application December 28, 1948, Serial No. 67,755

9 Claims. (Cl. 167—30)

This invention relates to improvements in insecticidal compositions and more particularly to improved solvents for chlorinated hydrocarbon insecticides.

It is known that certain chlorinated hydrocarbons are very effective in controlling pests, such as flies, mosquitoes, ants, roaches, spiders, etc., as well as plant pests, such as aphids, corn borers, plant scales, and the like. Examples of such well known chlorinated hydrocarbon insecticides are dichloro-diphenyl-trichloroethane, [bis-(methoxyphenyl)trichloroethane]; dichloro-diphenyl - dichloroethane; benzenehexachloride; 1,2,4,5,6,7,8,8-octachloro-4,7,methano-3a, 4,7,7a-tetrahydroindane; polychloro-bicyclic-terpenes; and other chlorinated hydrocarbons well known in the art. In applying insecticidal compositions containing such chlorinated hydrocarbons, the insecticide is either dissolved in a suitable carrier liquid, such as a hydrocarbon solvent or a composition emulsifiable with water. One of the difficulties encountered in employing chlorinated hydrocarbons is the tendency of such compounds to separate or precipitate out of oil solution particularly at chlorinated hydrocarbon concentrations in excess of 1% by weight, at temperatures below about 0° F. Once such materials are precipitated from the solution it is difficult to redissolve them even at elevated temperatures.

Heretofore, certain organic hydrocarbons, particularly methyl naphthalenes, have been used in combination with chlorinated hydrocarbons, such as dichloro-diphenyl-trichloroethane to prevent the separation of the latter from solution at low temperatures. However, the use of such materials has a disadvantage that they cause foliage damage, such as burning when applied to plants. It is an object of the present invention to provide an insecticidal composition containing a chlorinated hydrocarbon, which is stable at low temperatures. Another object of the invention is to provide an improved insecticidal composition containing a chlorinated hydrocarbon insecticide which will not separate at temperatures as low as about −30° F. or lower, and which is not injurious to plant foliage when applied thereto.

I have discovered that the foregoing objects can be attained by incorporating in insecticidal compositions, containing chlorinated hydrocarbons as the effective insecticide ingredient, a nitrocycloparaffin or mixtures thereof, in amounts sufficient to inhibit or prevent the chlorinated hydrocarbon from separating out of the insecticidal compositions at temperatures below about +32° F., and preferably below about 0° F. Nitrocycloparaffins, such as for example, nitrocyclohexane, alkyl substituted nitrocyclohexane, such as methylnitrocyclohexane, 1:3 dimethyl-nitro-cyclohexane, nitrocyclopentane, and alkyl substituted nitrocyclopentane, such as methylnitrocyclopentanes can be used. The nitrocycloparaffin can be used in quantities of from about 1% to about 75% by weight, and preferably from about 1% to about 10% by weight of the total concentrated formulation. In an insecticide concentrate as much as 75% of nitrocycloparaffin, i. e., nitrocyclohexane, can be used. The nitrocycloparaffin can be used effectively as the solvent or as an auxiliary solvent in combination with toxic component chlorinated hydrocarbons, such as for example, dichloro-diphenyl-trichloroethane, [bis(methoxyphenyl)-trichloroethane], dichloro-diphenyl-dichloroethane, benzene-hexachloride, 1,2,4,5,6,7,8,8-octachloro-4,7,methano-3a4,7,7a-tetrahydroindane, polychloro-bicyclic-terpenes, and others.

The present invention is not limited to the use of the chlorinated hydrocarbon insecticides herein specifically named, which are given merely by way of example, but is applicable to the stabilization against low temperature separation of insecticidal compositions containing chlorinated hydrocarbon insecticides in general. The chlorinated hydrocarbon insecticide is usually employed in quantities of from about 0.03% to about 5.0% by weight, or more, in dilute emulsion type horticultural sprays. In mosquito and fly control more concentrated sprays are used, chlorinated hydrocarbons usually being present within the range of from about 0.2% to about 10% by weight, and preferably from about 1% to about 5% by weight, based on total weight of diluent and emulsifier. In insecticide composition concentrates in general, including horticultural sprays, the chlorinated hydrocarbon can be used in concentrations as high as 45% by weight.

Depending upon the intended use of the insecticidal composition, the chlorinated hydrocarbon is either dissolved in a suitable carrier liquid, such as a hydrocarbon solvent or incorporated in a composition which is emulsifiable with water. The characteristics of the organic carrier liquid will depend largely upon the intended application of the insecticidal composition and therefore can be any hydrocarbon oil, preferably a petroleum oil ranging from distillates having kerosene distillation characteristics to viscous distillates or residuums and even crude oils. For most uses a suitable carrier liquid is a petroleum distillate having an A. S. T. M. distillation range of from about 350° F. to about 600° F., and preferably from about 370° F. to about 490° F.

An effective formulation for the control of flies, mosquitoes and the other insect pest containing a petroleum distillate having an A. S. T. M. distillation range of from about 370° F. to about 490° F., a chlorinated hydrocarbon and a nitrocycloparaffin is illustrated by the following:

| Component | Range, per cent by weight |
|---|---|
| Dichloro-diphenyl-trichloroethane | 0.2 to 10 |
| Nitrocyclohexane | 1.0 to 10 |
| Petroleum Distillate | Remainder |

Formulations of the above type can also contain combinations of various insecticides, at least one of which is a chlorinated hydrocarbon.

For application in controlling plant insect pests, such as aphids, mites and plant scales, for example, oyster shell scale, scurfy scale, San Jose scale, and the like, the chlorinated hydrocarbon and a nitrocycloparaffin or mixture of nitrocycloparaffins are employed in so-called soluble-oil type horticultural sprays which contain, in addition to the active insecticidal compound and the solvent therefor, a preferentially oil-soluble sulfonic acid soap, usually from about 5% to about 35%, and optionally, a small amount of a rosin or fatty acid soap to assist in the emulsification of the spray oils. A small amount of a naphthenic acid can also be incorporated in such compositions. Commercial products containing rosin derivatives, as for example "Dresinates," can be used. Naphthenic acids are used especially when the sulfonic acid soap contains an excess amount of alkalies resulting from the neutralization of the sulfonic acids. The quantity of naphthenic acid so used is just sufficient to neutralize the free alkali present in the oil-soluble sulfonic acid soap in order to give a final product which is substantially neutral or only slightly alkaline. Small proportions of other constituents, such as water, alcohol, antioxidants, or other materials can be added to the composition.

The preferentially oil-soluble sulfonic acid soaps employed are preferably the alkali metal, particularly the sodium soap of sulfonic acids. I prefer to use the oil-soluble soaps of sulfonic acids obtained by the treatment of petroleum oils with concentrated or fuming sulfuric acid, although other sulfonates can be used, for example the oil-soluble sulfonates obtained by the sulfonation of alkylated aromatics. Preferably, the oil-soluble sulfonic acid soaps employed are those prepared from preferentially oil-soluble sulfonic acids having equivalent weights of from about 360 to about 460. It has been found that the sulfonic acid soaps from sulfonic acids within this equivalent weight range possess the proper emulsifying property to form stable and uniform emulsions. While it is preferred to employ the soap of oil-soluble sulfonic acids within the aforementioned equivalent weight range, suitable sulfonic acid soaps can be obtained by blending sulfonic acids of different equivalent weights to obtain a product which exhibits the desired emulsification properties.

The hydrocarbon oil employed can be any oil ranging from a light kerosene or naphtha to a viscous white oil or lubricating oil. If the spray is to be used when the trees or plants are in a dormant state, it is not necessary to employ highly refined oils. Oils suitable for use in dormant-type sprays can range in viscosity from about 60 seconds to about 180 seconds or more (Saybolt Universal at 100° F.). Many grades of such oils suitable for use in oil sprays are available and in general are satisfactory for use in the herein-described and claimed compositions.

The following examples illustrate soluble-oil type concentrate compositions. The percentages are weight percentages except as otherwise noted:

*Example I*

| | | General range |
|---|---|---|
| Oil-soluble sulfonates | per cent | 10–20 |
| Soap | do | 2–3.5 |
| Hydrocarbon oil | do | 88–76.5 |
| Plus | | |
| Nitrocyclohexane | do | 1.0–3.0 |
| Chlorinated hydrocarbon | do | 1.0–5.0 |
| Alcohol | per cent (vol.) | 1.0–2.0 |
| Water | per cent (vol.) | 0.2–1.5 |

*Example II*

| Naphthenic acids | Per cent | 1.3–5.4 |
|---|---|---|
| Oil-soluble sulfonates | do | 7.9–32.1 |
| Hydrocarbon oil [1] | do | 90.8–62.5 |
| Plus | | |
| Nitrocyclohexane | do | 1.0–3.0 |
| Chlorinated hydrocarbon | do | 1.0–5.0 |
| Alcohol | per cent (vol.) | 1.0–2.0 |
| Water | per cent (vol.) | 0.2–1.5 |

[1] Saybolt Universal viscosity at 100° F.—60 to 180 seconds.

The following example is typical of a specific desirable composition:

*Example III*

| Oil-soluble sulfonates | per cent | 16.05 |
|---|---|---|
| Naphthenic acids | do | 2.7 |
| Petroleum oil [2] | do | 81.25 |
| Plus | | |
| Nitrocyclohexane | do | 1.0 |
| Chlorinated hydrocarbon | do | 1.0 |
| Alcohol | per cent (vol.) | 1.4 |
| Water | per cent (vol.) | 0.4 |

[2] Saybolt Universal viscosity at 100° F.—80–85 seconds.

The foregoing soluble-oil type spray compositions are particularly useful for the so-called dormant spray. For the control of certain insect pests which occur on plants or trees when bearing foliage in an actively growing condition, soluble-oil type sprays are used which may contain from 97.0 to about 83% of a highly refined mineral oil, from about 0.5% to about 3% of an aluminum soap, from about 0.5% to about 4% of an emulsifier, such as esters of a high molecular weight organic acid and from about 1.0% to about 5% of a chlorinated hydrocarbon, and from 1.0% to about 5.0% of a nitrocyclohexane; the percentages being weight percentages based on the total weight of formulation concentrate.

The hydrocarbon oil used in horticultural insect sprays of the soluble-oil type which are used for summer application or when growing buds and leaves are on the trees must be of relatively highly refined type. Such oils are usually obtained by treating a hydrocarbon, such as a petroleum oil, with fuming sulfuric acid. By this and other suitable treatment the unsaturated hydrocarbons and other materials which are harmful to plant tissue are largely removed. Technical white oils or pale oils having Saybolt Universal viscosities at 100° F. ranging from about 60 seconds to about 300 seconds are suitable for this purpose.

The soap employed in the described composition is an aluminum soap of a higher molecular weight fatty acid or aliphatic carboxylic acid such as for example, aluminum oleatee, aluminum cottonseed oil soap, aluminum naphthenate and the like. The emulsifier is an ester of a high molecular weight organic acid, preferably a polyhydroxy alcohol partially esterified with a high molecular weight fatty acid of the type described in U. S. Patents 1,949,798 and 1,949,799, partial esters of ethers of polyhydroxylic compounds of the type described in U. S. Patents 2,322,820 and 2,322,821, di-esters of polyalkylene glycol, or mixtures of the foregoing. The emulsifying agents of the types contemplated are derivatives of polyhydric alcohols such as glycerol, ethylene glycol, butylene glycol, erythritol, arabitol, mannitol, sorbitol, nonaethylene glycol, etc. By referring to the compounds used as "partially esterified polyhydric alcohols" it is meant that at least one of the hydroxyl groups of the alcohol has not been esterified by an acid. The partial esterification of the alcohols may be accomplished by means of either a saturated or unsaturated fatty acid, and while one of the lower acids of the series may be employed, as for example, acetic, propionic or butyric acids, it is preferred to make use of an acid of the "higher fatty acid" series or in other words, one having in the neighborhood of ten or more carbon atoms in each molecule. Among such are stearic, palmitic, oleic, and linoleic acids. Suitable higher hydroxy fatty acids are ricinoleic, dihydroxy stearic, hydroxy sebacic, etc. acids. In addition to the latter type of compound, derivatives thereof, namely acylated hydroxy acids, such as acetyl ricinoleic acid, butyryl hydroxy sebacic acid, etc. may also be used. If the particular alcohol used has more than two hydroxyl groups, it is of course, possible to have mixed esters of the type contemplated, that is, a different acid radical may be reacted with each of the hydroxy groups removed from the alcohol. Illustrative of the types of compounds described are the following: glyceryl mono-oleate, glyceryl mono-ricinoleate, glyceryl di-oleate, glyceryl mono- and di-acetyl ricinoleate, nonaethylene glycol di-oleate, sorbitan mono-oleate poly-oxyalkylene derivatives, and the like.

A composition suitable as a summer spray oil is illustrated by the following formulation:

*Example IV*

| | Per cent by weight |
|---|---|
| Dichloro-diphenyl-trichloroethane | 6 |
| Nitrocyclohexane | 3 |
| Aluminum oleate | 2 |
| Polyoxyethylene sorbitan trioleate [1] | 0.4 |
| Sorbitan trioleate [2] | 0.4 |
| Hydrocarbon oil [3] | 88.2 |

[1] Marketed by the Atlas Powder Company as Tween 85.
[2] Marketed by the Atlas Powder Company as Span 85.
[3] A petroleum white oil having a Saybolt Universal viscosity at 100° F. of about 80 to 85 seconds.

The effectiveness of the nitrocyclohexane in preventing the separation of chlorinated hydrocarbon insecticides at low temperatures as compared with a conventional aromatic solvent used for this service is demonstrated by the following data:

*Solubility tests*

| Test No. | Solvent | Chlorinated Hydrocarbon | Storage Temp. | | |
|---|---|---|---|---|---|
| | | | 80° F. | 0° F. | −30° F. |
| | | Per cent | | | |
| 1 | 65% Nitrocyclohexane | [1] 35 | N. S. | N. S. | N. S. |
| 2 | 65% Methylated Naphthalenes | [1] 35 | N. S. | S. | S. |
| 3 | 70% Nitrocyclohexane | [2] 30 | N. S. | | N. S. |
| 4 | 70% Methylated Naphthalenes | [2] 30 | N. S. | | S. |
| 5 | 97% Light Petroleum Distillate | [3] 3 | N. S. | S. | |
| | 70% Nitrocyclohexane | [2] 30 | N. S. | | N. S. |

[1] Dichloro-diphenyl-trichloroethane.
[2] [Bis(methoxyphenyl) trichloroethane].
[3] Polychloro-bicyclic terpene.

N.S.=No separation of chlorinated hydrocarbon.
S.=Separation of chlorinated hydrocarbon at temperature indicated.

In addition to the foregoing tests, it was determined that in an insect spray composition containing 5% dichloro-diphenyl-trichloroethane (DDT), 2.1% of a carbitol thiocyanate and a petroleum oil, 5% nitrocyclohexane was sufficient to keep the DDT in solution at −30° F., whereas 15% methylated naphthalene was required to keep the DDT in solution at −30° F.

The use of a nitrocycloparaffin or a mixture of nitrocycloparaffins as a solvent for chlorinated hydrocarbons in horticultural spray compositions is particularly advantageous in that such formulations can be used without causing foliage injury. Thus, the formulation of Example IV when emulsified in water at the concentration of 3 quarts per 100 gallons of water and applied to apple trees several times at intervals at about ten days apart caused no damage to the foliage. A similar formulation using methylated naphthalenes in place of the nitrocyclohexane caused severe injury to apple foliage when applied to apple trees. Another formulation consisting of nitrocyclohexane with 0.12% emulsifiers added was emulsified in water at a concentration of three pints per 100 gallons of water, that is, at about 0.35% concentration. This emulsion was applied to Delicious and Jonathan apple foliages, four times at approximately seven day intervals with no foliage injury resulting. In another test this substantially pure nitrocyclohexane formulation was emulsified in water at a concentration of 6 pints per 100 gallons of water, i. e. at about 0.7% concentration and applied to Jonathan apple trees four times at about seven day intervals without causing foliage injury.

While I have described my invention by reference to specific embodiments thereof, the invention is not to be limited thereto, but includes within its scope such modifications as come within the spirit and scope of the appended claims.

I claim:

1. An insecticidal composition containing about 0.03% to about 45%, by weight, of a chlorinated hydrocarbon selected from the class consisting of dichloro-diphenyl-trichloroethane, [bis (methoxy phenyl) trichloroethane] and dichloro - diphenyl - dichloroethane, a nitrocycloparaffin, and a normally liquid hydrocarbon solvent, said nitrocycloparaffin being used in amounts of from about 1% to about 75%, by weight, of the total composition, and said chlorinated hydrocarbon being in solution in said hydrocarbon solvent.

2. A composition as described in claim 1 in which the nitrocycloparaffin is a nitrocyclohexane.

3. A composition as described in claim 1 in which the nitrocycloparaffin is a nitrocyclopentane.

4. A composition of claim 1 in which the chlorinated hydrocarbon is dichloro-diphenyl-trichloroethane.

5. The composition as described in claim 1 in which the chlorinated hydrocarbon is [bis(methoxyphenyl)trichloroethane].

6. The composition of claim 1 in which the chlorinated hydrocarbon is dichloro-diphenyl-dichloroethane.

7. A horticultural soluble-oil insecticidal composition comprising from about 83% to about 97% of a highly refined mineral oil, from about 0.5% to about 3% of an aluminum soap, from about 0.5% to about 4% of an emulsifier, from about 1.0% to about 5% dichloro-diphenyl trichloroethane, and from about 1.0% to about 5.0% of a nitrocyclohexane.

8. An insecticidal composition consisting essentially of from about 0.2% to about 10% dichloro-diphenyl-trichloroethane, from about 1% to about 10% nitrocyclohexane and the remainder a petroleum distillate having a distillation range of from about 370° F. to about 490° F.

9. A horticultural soluble-oil spray composition comprising a petroleum oil and an emulsifier, from about 1% to about 45% dichloro-diphenyl-trichloroethane in solution in said petroleum oil, and from about 1% to about 75% by weight, based on the total composition, of a nitrocyclohexane, said nitrocyclohexane being used in sufficient quantity to prevent the separation of dichloro-diphenyl-trichloroethane from said composition at a temperature of about 0° F.

LOYD Q. BOYD.

REFERENCES CITED

The following references are of record in the file of this patent:

UNITED STATES PATENTS

| Number | Name | Date |
|---|---|---|
| 2,411,502 | Burrows | Nov. 26, 1946 |
| 2,488,665 | Fleck et al. | Sept. 7, 1948 |

OTHER REFERENCES

Committee on Medical Research of the Office of Scientific Research and Develop., Natl. Research Council Insect Control Committee Report No. 167, Final Report May 1944 to 31. Oct. 1945, Annand OEMcmr-M-4331, Section 2 (of 4 sections) page 24.